US012423359B1

(12) United States Patent
Kasim

(10) Patent No.: US 12,423,359 B1
(45) Date of Patent: Sep. 23, 2025

(54) SYSTEMS AND METHODS FOR CROSS-PLATFORM DOCUMENT PROCESSING AND LIFECYCLE MANAGEMENT INTEGRATION WITH ARTIFICIAL INTELLIGENCE CONTENT ASSISTANT

(71) Applicant: OPEN TEXT HOLDINGS, INC., Menlo Park, CA (US)

(72) Inventor: Ravikanth Kasim, Hyderabad (IN)

(73) Assignee: Open Text Holdings, Inc., Menlo Park, CA (US)

( * ) Notice: Subject to any disclaimer, the term of this patent is extended or adjusted under 35 U.S.C. 154(b) by 0 days.

(21) Appl. No.: 18/680,168

(22) Filed: May 31, 2024

(51) Int. Cl.
*G06F 16/33* (2025.01)
*G06F 16/3329* (2025.01)
*G06F 16/334* (2025.01)
*G06F 16/93* (2019.01)

(52) U.S. Cl.
CPC .......... *G06F 16/93* (2019.01); *G06F 16/3329* (2019.01); *G06F 16/3347* (2019.01)

(58) Field of Classification Search
CPC ... G06F 16/93; G06F 16/3347; G06F 16/3329
See application file for complete search history.

(56) References Cited

U.S. PATENT DOCUMENTS 9,146,784 B2 * 9/2015 Ramanathaiah ...... G06F 9/5038
2023/0016233 A1 * 1/2023 Gubbi Lakshminarasimha ..........
G06N 20/00

\* cited by examiner

*Primary Examiner* — Loc Tran
(74) *Attorney, Agent, or Firm* — Sprinkle IP Law Group

(57) ABSTRACT

A document process automation system includes a user interface for uploading a document and invoking an artificial intelligence (AI) content assistant. When invoked, a chat window for the AI content assistant is displayed. The AI content assistant leverages a chat service to enable querying a status of the document through the chat window. The system further includes a document enrichment module, an inbound application programming interface (API), and a document API. The document enrichment module determines a category of the document and attaches attributes associated with the category to the document. The inbound API reads the document and creates a copy of the document for a document management system. The document API reads status updates to the copy of the document from a document queue and updates the attributes associated with the document. The user interface is configured for presenting the attributes thus updated as properties of the document.

20 Claims, 6 Drawing Sheets xECM

/ ENTERPRISE / WORKSPACES / CONTRACTS / 2024-0002 INVOICE (SUNCHEMICALS) / DOCUMENTS 2024-0002 Invoice (Sunchemicals)

Overview  Documents

322 — DOCUMENTS

Name

| | | Size | Modified |
|---|---|---|---|
| Adda 125_2867_12-01-2024.pdf | | 169 KB | 03/19/2024 11:03 PM |
| Sub dealer price - 1200x600.pdf | | 13 KB | 03/19/2024 9:35 PM |

SYSTEMS AND METHODS FOR CROSS-PLATFORM DOCUMENT PROCESSING AND LIFECYCLE MANAGEMENT INTEGRATION WITH ARTIFICIAL INTELLIGENCE CONTENT ASSISTANT

TECHNICAL FIELD

This disclosure relates generally to document processing and lifecycle management in a networked computing environment. More particularly, this disclosure relates to systems, methods, and computer program products for cross-platform, multi-system document processing and lifecycle management integration with an artificial intelligence content assistant.

BACKGROUND OF THE RELATED ART

In recent years, demand for document process automation has been increasing significantly.

However, certain types of documents are not suitable for automation. For instance, processing invoices electronically for digital payments (a process of which is referred to as electronic invoicing or e-invoicing) still requires manual intervention such as checking on the status of a particular invoice as the invoice is being processed through the various stages of its lifecycle.

As those skilled in the art can appreciate, manual intervention during a document process automation is error prone and often results in delays. These issues are compounded by the increasingly large amounts of documents that need to be processed in a timely manner.

Further, document process automation systems are complex. Often, training is required before a user is able to use a document process automation system effectively and/or efficiently.

In view of the foregoing, there is a need for a scalable, user-friendly solution for document processing automation. The invention disclosed herein can address this need and more.

SUMMARY OF THE DISCLOSURE

A goal of this disclosure is to provide a scalable, user-friendly solution for document processing automation. According to embodiments, this goal is realized in a cross-platform, multi-system document process automation that integrates or otherwise leverages, in whole or in part, an extended enterprise content management (xECM) system, a content sever, an enterprise system such as an enterprise resource planning (ERP) system, a document management system such as a vendor invoice management system, an event mesh service, an intelligent artificial intelligence (AI) content assistant, content AI services, a machine learning (ML) platform, a collaboration application, a messaging application, an approval tool, etc.

In some embodiments, a method for document process automation can include receiving, by the xECM system operating on a server machine in an enterprise computer network, a document uploaded by a user of the xECM system through a user interface of the xECM system. As a non-limiting example, the user may upload the document to a folder within the user's workspace.

In some embodiments, the xECM system may include a document enrichment logic or module configured for determining a category of the document. An administrator of the xECM system may define category attributes specific to the category. The category is specific to a document type of the document. Thus, if the document comprises an invoice, the category attributes may comprise invoice-related attributes such as an invoice number, an invoice amount, an invoice status, and an approver for the invoice. The xECM system may have a plurality of categories such as legal documents, lease agreements, purchase orders, etc. Each category has a defined set of category attributes. Thus, sets of category attributes may vary from category to category.

In some embodiments, the document enrichment module is further configured for attaching the category attributes to the document. The xECM system then stores the document and the category attributes attached to the document in a content server communicatively connected to the xECM system.

In some embodiments, the content server is configured for storing the document at a first resource location accessible by an inbound application programming interface (API) and storing the category attributes at a second resource location accessible by a document API. In some embodiments, the inbound API is configured for reading the document from the first resource location and creating a copy of the document for a document management system such as a vendor invoice management system that is part of an ERP system. The vendor invoice management system is configured for creating a document topic for the copy of the document and communicating the document topic to an event mesh service through a document workflow API.

In some embodiments, the event mesh service is configured for receiving the document topic from the document workflow API, placing the document topic in a document queue, receiving status updates to the document topic through the document workflow API as the copy of the document progresses through a document workflow, and pushing each of the status updates to the document queue. In some embodiments, the document API subscribes to the document queue and is configured for reading the status updates from the document queue and updating the category attributes at the second resource location. Through the user interface of the xECM system, the category attributes thus updated by the document API are viewable by the user as properties of the document.

In some embodiments, the invoice management system is configured for sending a notification about the copy of the document needing an approval review through a notification API to an approval tool. The approval tool can be part of a larger application or system such as a collaboration application. As a non-limiting example, the approval tool is configured for communicating an approval status reflective of the approval review through an approval API to the invoice management system. The approval status is communicated to the document topic through the document workflow API. The approval status is placed in the document queue by the event mesh service and read from the document queue by the document API to update the category attributes stored at the second resource location.

While the user can view the status of the document by navigating to a document property page that lists the category attributes of the document corresponding to the document type, it can be cumbersome and time-consuming to do so with a large number of documents. To this end, the user interface of the xECM system is configured with a user interface element for invoking an AI content assistant. When invoked, a chat window for the AI content assistant is displayed and the user can query AI content assistant on the status of the document using an identifier such as an invoice number. In some embodiments, the xECM system is integrated with content AI services that include a chat service.

In some embodiments, the chat service is configured for checking with the content server on a permission level of the user who is querying the status of the document using an identifier such as the invoice number. In some embodiments, the chat service is further configured for querying a large language model (LLM) with embeddings generated by the content server from the document. The embeddings are stored, through an embeddings service, in a vector form in a vector store accessible by the chat service. The LLM, which is hosted on a machine learning platform, is trained to generate a chat response based on the embeddings. The chat response is communicated through the chat service to the chat window for a timely, user friendly response to the user's inquiry about the status of the document.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3 depicts a diagrammatic representation of an example of a user interface of an xECM system integrated with an AI content assistant according to some embodiments disclosed herein.

FIG. 4 shows an example of a document information page through which a user can navigate to a document property page according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As alluded to above, a goal of this disclosure is to provide a scalable, user-friendly solution for document processing automation. To achieve this goal, a document process automation system integrates or otherwise leverages, in whole or in part, with a variety of content management, collaboration, messaging, and AI-assisted applications and systems across different computing platforms.

Figure 1:
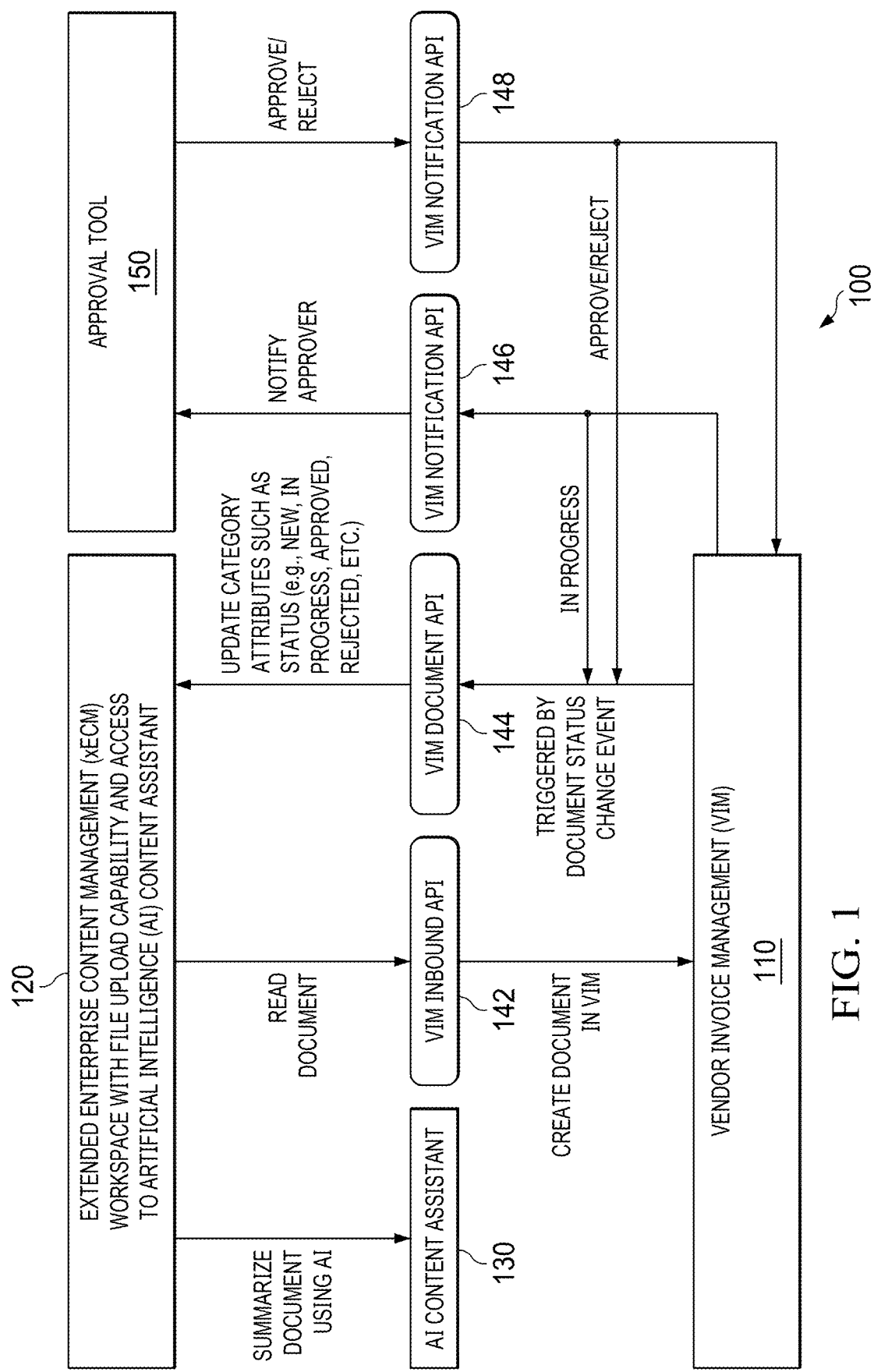
FIG. 1 depicts a diagrammatic representation of an example of a high level document process automation architecture, showing integration between an xECM system, an AI content assistant, a vendor invoice management system, and an approval tool through an inbound API, a document API, a notification API, and an approval API, according to some embodiments disclosed herein.

FIG. 1 depicts a diagrammatic representation of an example of a high level document process automation architecture, showing integration between a vendor invoice management (VIM) system 110, an xECM system 120, an AI content assistant 130, and an approval tool 150 through a VIM inbound API 142, a VIM document API 144, a VIM notification API, and a VIM approval API. A user of the xECM system 120 does not need to directly interface or otherwise interact with the VIM system 110. Rather, the user uploads a document (or documents) using a file upload functionality within the xECM system 120. For the purpose of illustration, in this example, the document is an invoice.

As described below, the xECM system 120 attaches category attributes to the invoice. Then, the VIM inbound API 142 reads the invoice from the xECM system 120 and creates a corresponding internal invoice in the VIM system 110. The internal invoice generated by the VIM system 110 (which can be considered as a copy of the invoice from the xECM system 120) is automatically processed through a document workflow operated by the VIM system 110. The document workflow corresponds to stages of a lifecycle specific to the invoice's document type, e.g., "creation," "in progress," "review," "approved/rejected," "completed," etc.

The status of the invoice is monitored throughout the document workflow and any status update is communicated to the xECM system 120 so that the user is kept abreast of any status changes. More specifically, each time the internal invoice transitions from one stage to another, the status change is communicated to the xECM system 120 through the VIM document API 144.

Once the document workflow is completed, the VIM system 110 is operable to notify an approver (not shown) through the VIM notification API 146. The VIM notification API 146 gets a result from the approver and returns the result (e.g., "approved" or "rejected") to the VIM system 110 through the VIM approval API 150.

In turn, the VIM system 110 communicates the result to the xECM system 120 through the VIM document API 144. The xECM system 120 updates the category attributes attached to the invoice.

In the example of FIG. 1, the xECM system 120 is integrated with the AI content assistant 130, which is capable of summarizing, using AI, the document process automation as applied to the invoice, including predicting when the invoice might be approved or rejected. The cross-platform integration with a variety of systems and applications, including an AI content assistant, is further described below with reference to FIG. 2.

Figure 2:
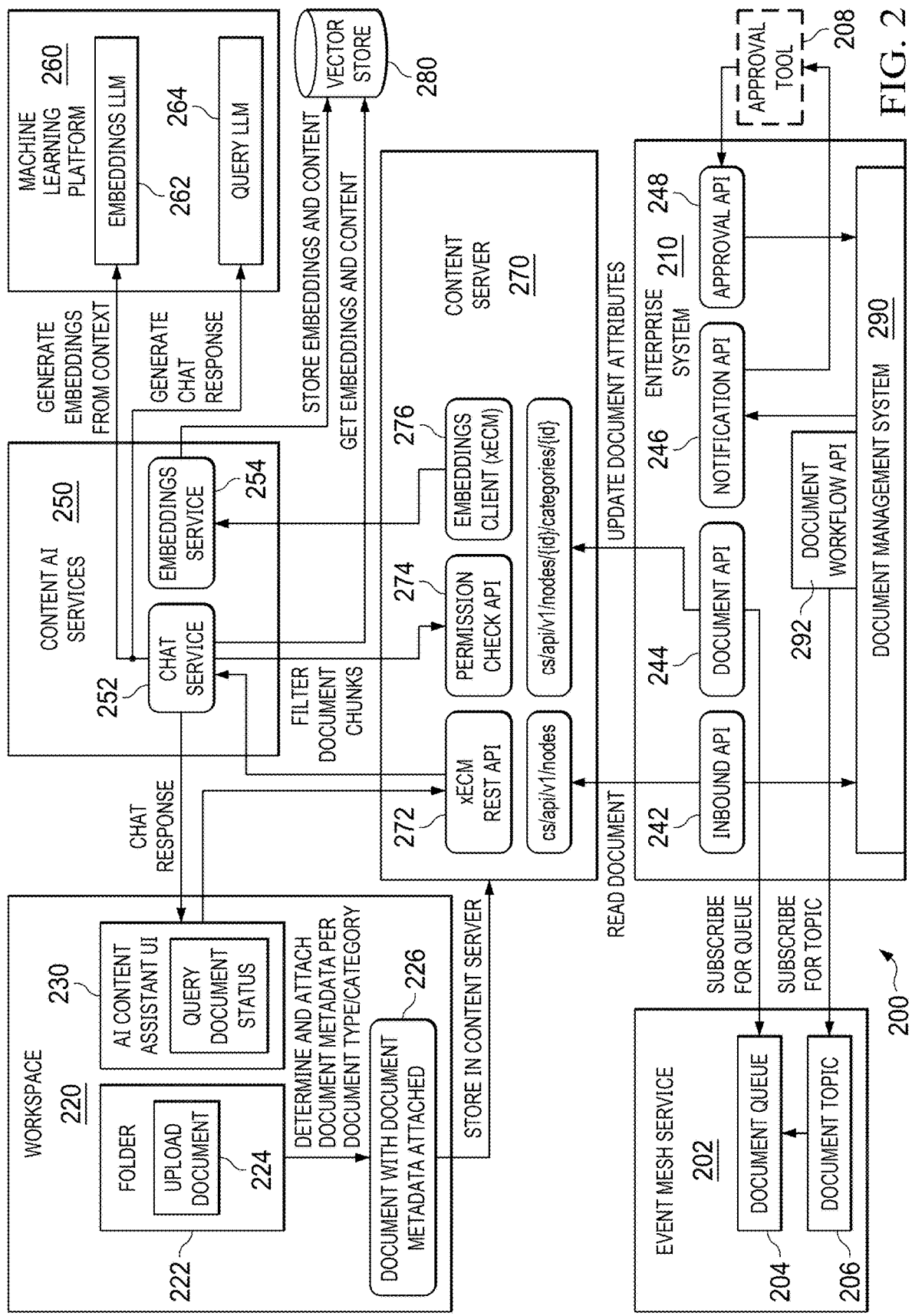
FIG. 2 depicts a diagrammatic representation of an example of operations involved in a document process automation according to some embodiments disclosed herein.

FIG. 2 depicts a diagrammatic representation of an example of cross-platform, multi-system operations involved in a document process automation. In some embodiments, a method for document process automation can include receiving, by an xECM system operating on a server machine in a networked computing environment 200, a document uploaded by a user of the xECM system through a user interface of the xECM system. As a non-limiting example, the user may upload the document to a folder within the user's workspace 220.

FIG. 3 depicts a diagrammatic representation of an example of a user interface 300 representing a workspace within an xECM system. In this example, the user interface 300 includes a file upload function accessible through a user interface element 328. In one embodiment, the file upload function allows the user to import various types of documents from disparate data sources. In this example, the user uploads a document 324 in the Portable Document Form (PDF) to a folder 322 within the workspace.

Returning to FIG. 2, a user of the xECM system uploads a document 224 to a folder 222 within the user's workspace 222. The xECM system is configured for securely governing the lifecycle of the document 224 by integrating with a variety of enterprise applications, including an enterprise system 210, which includes a document management system 290, content AI services 250, and a content server 270. The integrated xECM provides a wide variety functionalities, including workspace chat and video conferencing, file storage, and proprietary and third-party application integration. As such, a user of the xECM system only needs to interact with the xECM to submit and have a document automatically processed, even if processing the user-provided document may involve multiple systems cross different platforms.

In some embodiments, the xECM system may include a document enrichment logic or module 226 configured for determining a category of the document. An administrator of the xECM system may define category attributes specific to the category. The category is specific to a document type of the document. Thus, if the document comprises an invoice, the category attributes may comprise an invoice number, an invoice amount, an invoice status, and an approver for the invoice. The xECM system may have a plurality of categories such as legal documents, lease agreements, contracts, purchase orders, etc. Each category has a defined set of category attributes. Thus, different document types are associated with different categories and different category attributes.

In this example, after the document 224 is uploaded to the folder 222, the document enrichment module 226 determines a category of the document 224 (e.g., based on a document type of the document 224) and attaches category attributes to the document 224.

An administrator of the xECM system may define categories within the xECM system and category attributes associated with each of the categories. These category attributes can be utilized by process flows described below.

Once attached, these category attributes become part of the document 224. The xECM system then stores the document and the category attributes attached to the document in the content server 270. All the content will be available as part of the content server 270.

In some embodiments, the content server is configured for storing the document at a first resource location accessible by an inbound API 242 and storing the category attributes at a second resource location accessible by a document API 244. In some embodiments, the inbound API 242 is configured for reading the document from the first resource location and creating a copy of the document for a document management system 290, such as a VIM system, that is part of the enterprise system 210. The copy of the document thus created is internal to the document management system 290. The document management system 290 is configured for creating a document topic for the internal document and for communicating the document topic to an event mesh service 202 through a document workflow API 292.

In some embodiments, once the content (e.g., the document 224 and the category attributes attached to the document 224) is available in the content server 270, the content is pushed (e.g., through an embeddings client 276) as input into content AI services 250. In turn, the content AI services 250 divide or otherwise process (e.g., through an embeddings service 254) the input content into chunks of embeddings. Embeddings are a natural language processing (NLP) technique that converts textual data into numerical vectors that can be processed by machine learning (ML) algorithms. In this case, the document 224 is chunked into embeddings and an index is created for each embedding. The embeddings service 254 generates vectors, each representing an embedding, and stores the embeddings in a vector form in a vector store 280.

In some embodiments, the embeddings stored in the vector store 280 can be input to large language models (LLMs) 262, 264 hosted on a ML platform 260. Embeddings are numerical representations of real-world objects that ML and AI systems use to understand complex knowledge domains like humans do. These embeddings are useful in training LLMs. An AI service reads embeddings and sends the embeddings to an embeddings LLM, the embeddings LLM will try to find the closest answers to the embeddings. Such answers can be used to summarize a document of interest (e.g., a document in the user's workspace). For example, a user may ask, through an AI content assistant user interface 230, "what is the status of the invoice?" The AI content assistant may respond, via the user interface 230, "The invoice has been approved by Mr. Bossman. Based on the current workload, the document is expected to be processed in two weeks." Further, ML models, including generative AI models, are suited for creating embeddings by identifying patterns within large text datasets. These contextual embeddings can be used to augment embeddings generated from an input document in generating a contextual response for conversing with a user.

In some embodiments, once the content is available in the content server 270, the content server 270 calls the inbound API 242 with the document 224 (with the category attributes attached) to have the document 224 processed by the document management system 290. In response, the document management system 290 reads, via the inbound API 242, the document 224 along with the category attributes from the content server 270 and creates a corresponding internal document and a document topic 206 (e.g., "document created").

The document topic 206 is sent to an event mesh service 202 through the document workflow API 292. In some embodiments, the event mesh service 202 is configured for receiving the document topic 202 from the document workflow API 292, placing the document topic 206 in a document queue 204, receiving status updates to the document topic 206 through the document workflow API 292 as the internal document progresses through a document workflow, and pushing each of the status updates to the document queue 204. In some embodiments, the document API 244 subscribes to the document queue 204 and is configured for reading the status updates from the document queue 204 and updating the category attributes stored at the second resource location (e.g., "cs/api/v1/nodes/{id}/categories/{id}") in the content server 270.

The document workflow API 292 subscribes to the document topic 206, which is managed by the event mesh service 202, so that the document workflow API 292 will always be aware of the status of the internal document (e.g., when the internal document is newly created, when the internal document is in process, when the internal document is being paid, etc.) as the internal document is processed through the document workflow.

As the document workflow progresses, it continuously updates the document topic 206 through the document workflow API 292 (e.g., "created," "in progress," "in view," etc.). The event mesh service receives the updates through the document topic 206 and stores the updates in the document queue 204. As discussed above, the document API 244, which subscribes to the document queue 204, reads the updates from the document queue 204 and communicates the updates to the content server 270, for instance, at the referenced resource location.

The xECM system reads the category attributes attached to the document 224 from the same referenced location and presents the category attributes thus updated to the user through the xECM system's user interface. The user does not need to call or contact anyone about the document. In this way, any event change happening to the internal document in the document management system 290 during the document workflow, the document's category attributes will be updated continuously and the updates will be sent to the folder 222 so that they are visible through a user interface of the xECM system.

Figure 4:
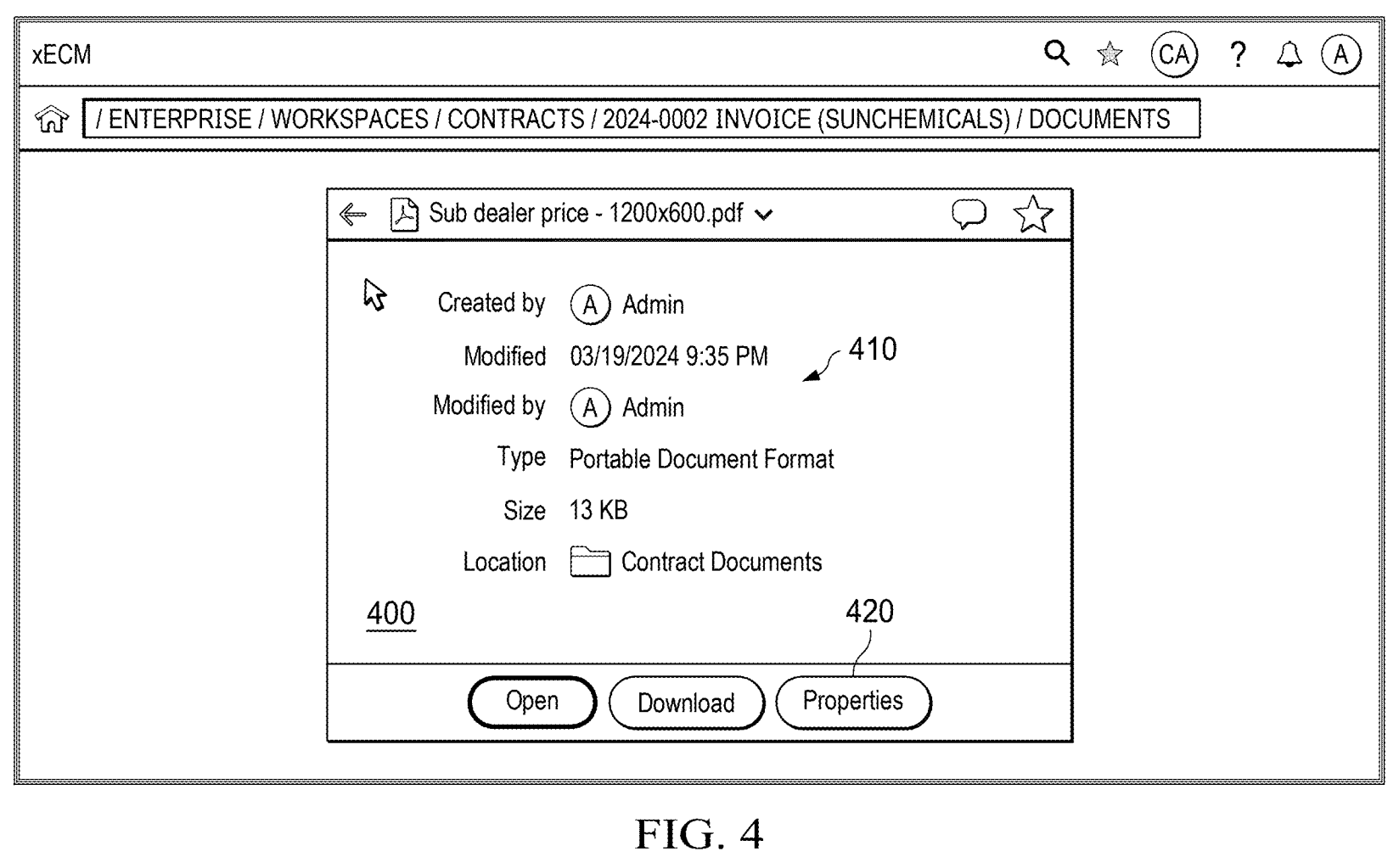
Figure 5:
FIG. 5 shows an example of a document property page with up-to-date category attributes according to some embodiments disclosed herein.

FIG. 4 shows an example of a document information page 400 through which a user can view certain document information 410 and navigate to a document property page through a user interface element 420 according to some embodiments disclosed herein. FIG. 5 shows an example of a document property page 500 with up-to-date category attributes 526 according to some embodiments disclosed herein.

While the user can view the status of a document by navigating to a document property page that lists the category attributes of the document, it can be cumbersome to do so with a large number of documents. To this end, the xECM system is integrated with an AI content assistant. As illustrated in FIG. 3, the user interface 300, which represents the user's workspace within the xECM system, is integrated with an AI content assistant function accessible through a user interface element 330.

When invoked, a chat window for the AI content assistant (e.g., the AI content assistant user interface 230) is displayed and the user can query the AI content assistant on the status of the document, using an identifier such as an invoice number. Referring to FIG. 2, the chat window is supported by a chat service 252 through an xECM REST API 272.

In some embodiments, the chat service 252 is configured for checking, via a permission check API 274, with the content server 270 on a permission level of the user who is querying the status using the invoice number. In some embodiments, the chat service 252 may leverage the LLM 262 to generate additional embeddings from contextual information obtained from a conversation with the user via the chat window. The additional embeddings can be stored, via the chat service 252, in the vector store 280.

In some embodiments, the chat service 252 is further configured for querying the LLM 264 with embeddings generated by the content server 270 from the document 224 and/or embeddings generated by the LLM 262 from the contextual information obtained in real time via the chat window. As discussed above, the embeddings are stored, through the embeddings service 254, in a vector form in the vector store 280 which is accessible by the chat service 252. The LLM 264, which is hosted on the ML platform 260, is trained, based on historical embeddings, to generate a chat response based on input embeddings (e.g., "the document is processed," "the document is not processed due to an error," "the document was processed six months ago," "the document is going to be processed in two weeks," etc.).

In some embodiments, the chat response can include a prediction on when processing of the document 224 might be completed (e.g., based on a stage of the internal document's lifecycle), whether the document 224 might be approved or rejected (e.g., based on the historical data of similar documents that had gone through the same workflow), etc. The chat response is communicated through the chat service 252 to the chat window for a timely, user friendly response to the user's inquiry about the status of the document 224.

Through the AI content assistant, which is built on top of the xECM system, the user can find out the status of any particular document using, for instance, an identifier associated with the respective document. This integration can be useful if the user has thousands of documents in their workspace. That is, instead of having to open each document in their workspace and check the respective document's properties in order to get the most recent status, the user can, for instance, use a document identifier, an invoice number, or the like, through the AI content assistant, to query the status of any particular invoice. For example, a user can type a query at a prompt of the chat window of the AI content assistant, the user's query causes the chat service to read embeddings from the vector store, check whether the user has permission(s) for the embeddings, and invoke the LLM which returns the generated AI content.

In some embodiments, the notification API 246 sends a notification to an approver through an approval tool 208. The approval tool 208 may be integrated with an email application and/or a collaboration tool. The notification, which may be in the form of an electronic message or mail, may indicate to the approver: "Please process this invoice." The approver reads the notification and responds with a return message or using the collaboration tool hooked to an Approval API 248. The approver's response (e.g., "the invoice is approved") is communicated by the Approval API to the document management system 290. Any suitable approval platform or tool can be used. The document workflow processes the invoice in view of the approver's response and updates a corresponding category attribute (e.g., "invoice status=approved"). The updated category attribute is communicated to the document topic, which updates the document queue. Again, the document API, which subscribes to the document queue, reads the update from the document queue and makes the updated category attribute available to the user via the xECM system. The background automation (i.e., the processing of the invoice) is completed at this point.

Embodiments of the invention provide many advantages. For example, all the information captured is securely stored and centrally managed by the content server. Further, integrating with an AI content assistant enables the xECM system to leverage the AI content assistant's ability to summarize the status of document based on user prompts, shielding a user of the xECM system from the complexity of underlying systems and improving the efficiency of document process automation.

Figure 6:
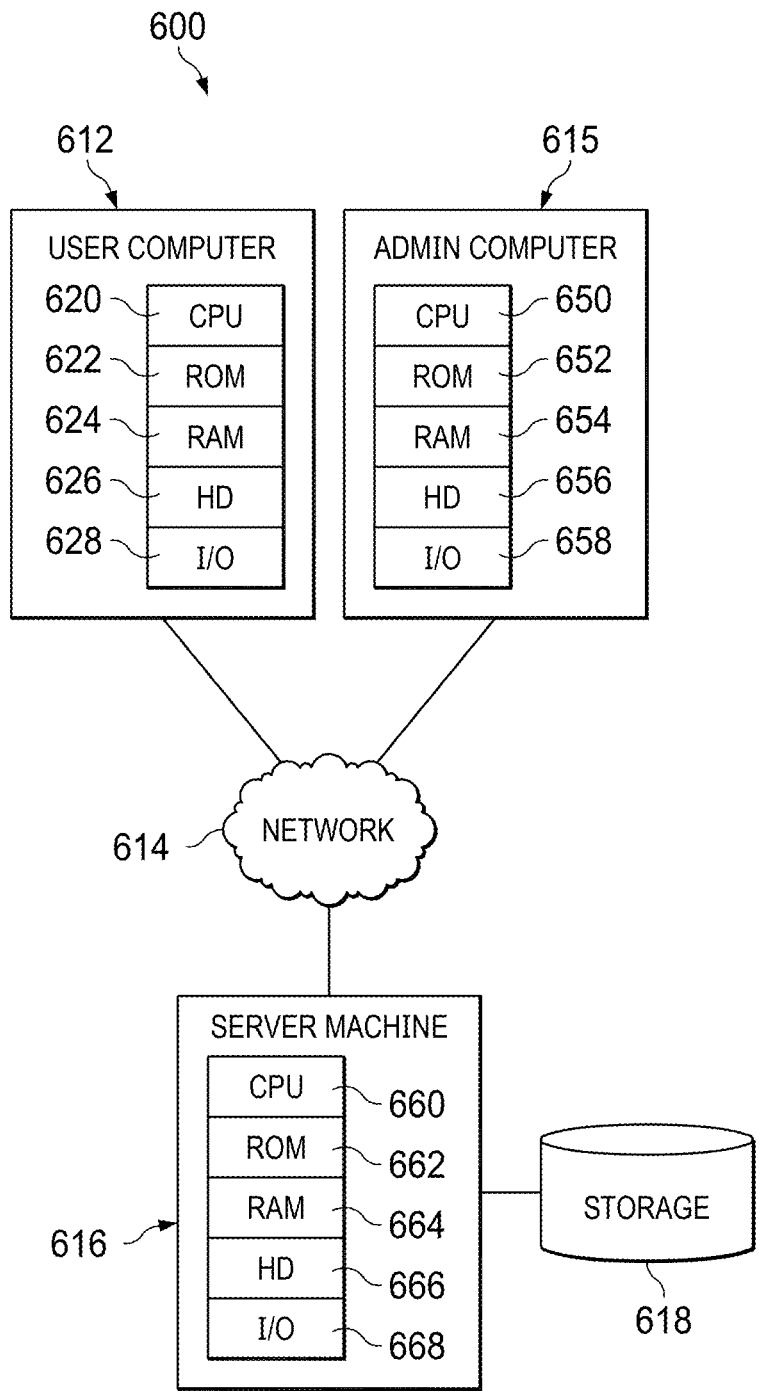
FIG. 6 depicts a diagrammatic representation of an example of distributed network computing environment where embodiments disclosed herein can be implemented.

FIG. 6 depicts a diagrammatic representation of an example of distributed network computing environment where embodiments disclosed herein can be implemented. In the example illustrated, network environment 600 includes network 614 that can be bi-directionally coupled to user device 612 (e.g., for a user of an xECM system), administrator computer 615 (e.g., for creating a category and/or defining category attributes), and server computer 616 (e.g., for running a document process automation system). Server computer 616 can be bi-directionally coupled to database 618. Database 618 may include a vector store configured for storing embeddings in the form of vectors. Network 614 may represent a combination of wired and wireless networks that network computing environment 600 may utilize for various types of network communications known to those skilled in the art.

For the purpose of illustration, a single system is shown for each user device 612, administrator computer 615, and server computer 616. However, within each of user device 612, administrator computer 615, and server computer 616, a plurality of networked devices and computers alike (not shown) may be interconnected to each other over network 614. For example, a plurality of user devices 612, a plurality of server computers 616, and a plurality of administrator computers 615 may be coupled to network 614.

User device 612 can include central processing unit ("CPU") 620, read-only memory ("ROM") 622, random access memory ("RAM") 624, hard drive ("HD") or storage memory 626, and input/output device(s) ("I/O") 628. I/O 628 can include a keyboard, monitor, printer, electronic pointing device (e.g., mouse, trackball, stylus, etc.), or the like. User device 612 can include a desktop computer, a laptop computer, a personal digital assistant, a cellular phone, or nearly any network-enabled device capable of communicating over a network. Administrator computer 615 may be similar to user computer 612 and can comprise CPU 650, ROM 652, RAM 654, HD 656, and I/O 658. Likewise, server computer 616 may include CPU 660, ROM 662, RAM 664, HD 666, and I/O 668. Many other alternative configurations are possible and known to skilled artisans.

Each of the computers in FIG. 6 may have more than one CPU, ROM, RAM, HD, I/O, or other hardware components. For the sake of brevity, each computer is illustrated as having one of each of the hardware components, even if more than one is used. Each of computers 612, 615, and 616 is an example of a data processing system. ROM 622, 652, and 662; RAM 624, 654, and 664; HD 626, 656, and 666; and data store 618 can include media that can be read by CPU 620, 650, or 660. Therefore, these types of memories include non-transitory computer-readable storage media. These memories may be internal or external to computers 612, 615, or 616.

Portions of the methods described herein may be implemented in suitable software code that may reside within ROM 622, 652, or 662; RAM 624, 654, or 664; or HD 626, 656, or 666. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD- ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the invention should be determined by the following claims and their legal equivalents.

What is claimed is:

1. A method for document process automation, the method comprising:
   receiving, by an extended enterprise content management (xECM) system operating on a server machine in an enterprise computer network through a user interface, a document;
   determining, by the xECM system, a category of the document, the category associated with category attributes;
   attaching, by the xECM system, the category attributes to the document;
   storing, by the xECM system, the document and the category attributes attached to the document in a content server;
   wherein the content server is configured for:
      storing the document at a first resource location accessible by an inbound application programming interface (API); and
      storing the category attributes at a second resource location accessible by a document API;
   wherein the inbound API is configured for:
      reading the document from the first resource location; and
      creating a copy of the document for a document management system;
   wherein the document management system is configured for:
      creating a document topic for the copy of the document; and
      communicating the document topic to an event mesh service through a document workflow API;
   wherein the event mesh service is configured for:
      receiving the document topic from the document workflow API;
      placing the document topic in a document queue;
      receiving status updates to the document topic through the document workflow API as the copy of the document progresses through a document workflow; and
      pushing each of the status updates to the document queue;
   wherein the document API subscribes to the document queue and is configured for:
      reading the status updates from the document queue; and
      updating the category attributes at the second resource location; and
   presenting, by the xECM system through the user interface, the category attributes thus updated by the document API as properties of the document.

2. The method according to claim 1, wherein the category is specific to a document type of the document, wherein the document comprises an invoice, wherein the category attributes comprise an invoice number, an invoice amount, an invoice status, and an approver for the invoice.

3. The method according to claim 2, wherein the document management system comprises an invoice management system and wherein the invoice management system is part of an enterprise resource planning system.

4. The method according to claim 3, wherein the invoice management system is configured for sending a notification about the copy of the document needing an approval review through a notification API to an approval tool, wherein the approval tool is configured for communicating an approval status reflective of the approval review through an approval API to the invoice management system, wherein the approval status is communicated to the document topic through the document workflow API, and wherein the approval status is placed in the document queue by the event mesh service and read from the document queue by the document API to update the category attributes stored at the second resource location.

5. The method according to claim 2, wherein the user interface comprises a user interface element for invoking an artificial intelligence (AI) content assistant, wherein a chat window for the AI content assistant is displayed through the user interface in response to the user interface element being actuated, and wherein the AI content assistant leverages a chat service to enable querying the invoice status using the invoice number provided through the chat window.

6. The method according to claim 5, wherein the content server is further configured for chunking the document into embeddings, wherein the embeddings are stored, through an embeddings service, in a vector form in a vector store, wherein the vector store is accessible by the chat service, wherein the chat service is configured for querying a large language model (LLM) with the embeddings, wherein the LLM is hosted on a machine learning platform and trained to generate a chat response based on the embeddings, and wherein the chat response is communicated through the chat service to the chat window.

7. The method according to claim 5, wherein the chat service is further configured for checking with the content server on a permission level of a user who is querying the invoice status using the invoice number.

8. A system for document process automation, the system comprising:
   a processor;
   a non-transitory computer-readable medium; and
   instructions stored on the non-transitory computer-readable medium and translatable by the processor for implementing:
      a user interface having a first user interface element for uploading a document and a second user interface element for invoking an artificial intelligence (AI) content assistant, wherein a chat window for the AI content assistant is displayed through the user interface in response to the second user interface element being actuated, and wherein the AI content assistant leverages a chat service to enable querying a status of the document through the chat window;
      a document enrichment module for determining a category of the document and attaching category attributes associated with the category to the document, wherein the document is stored a first resource location managed by a content server and wherein the category attributes attached to the document is stored at a second resource location managed by the content server;
      an inbound application programming interface (API) configured for:
         reading the document from the first resource location; and
         creating a copy of the document for a document management system; and
      a document API configured for:
         reading status updates to the copy of the document from a document queue; and
         updating the category attributes at the second resource location;

wherein the user interface is further configured for presenting the category attributes thus updated by the document API as properties of the document.

9. The system of claim 8, wherein the category is specific to a document type of the document, wherein the document comprises an invoice, wherein the category attributes comprise an invoice number, an invoice amount, an invoice status, and an approver for the invoice.

10. The system of claim 9, wherein the document management system comprises an invoice management system and wherein the invoice management system is part of an enterprise resource planning system.

11. The system of claim 10, wherein the invoice management system is configured for sending a notification about the copy of the document needing an approval review through a notification API to an approval tool, wherein the approval tool is configured for communicating an approval status reflective of the approval review through an approval API to the invoice management system, wherein the approval status is communicated to a document topic through a document workflow API of the invoice management system, and wherein the approval status is placed in the document queue by an event mesh service and read from the document queue by the document API to update the category attributes stored at the second resource location.

12. The system of claim 8, wherein the content server is configured for chunking the document into embeddings, wherein the embeddings are stored, through an embeddings service, in a vector form in a vector store, wherein the vector store is accessible by the chat service, wherein the chat service is configured for querying a large language model (LLM) with the embeddings, wherein the LLM is hosted on a machine learning platform and trained to generate a chat response based on the embeddings, and wherein the chat response is communicated through the chat service to the chat window.

13. The system of claim 8, wherein the chat service is further configured for checking with the content server on a permission level of a user who is querying the invoice status using the invoice number.

14. A computer program product for document process automation, the computer program product comprising a non-transitory computer-readable medium storing instructions translatable by a processor for:
receiving, through a user interface, a document;
determining a category of the document, the category associated with category attributes;
attaching the category attributes to the document;
storing the document at a first resource location managed by a content server;
storing the category attributes attached to the document at a second resource location managed by the content server, wherein the first resource location is accessible by an inbound application programming interface (API) and the second resource location is accessible by a document API;
wherein the inbound API is configured for:
reading the document from the first resource location; and
creating a copy of the document for a document management system;
wherein the document management system is configured for:
creating a document topic for the copy of the document; and
communicating the document topic to an event mesh service through a document workflow API;

wherein the event mesh service is configured for:
receiving the document topic from the document workflow API;
placing the document topic in a document queue;
receiving status updates to the document topic through the document workflow API as the copy of the document progresses through a document workflow; and
pushing each of the status updates to the document queue;
wherein the document API subscribes to the document queue and is configured for:
reading the status updates from the document queue; and
updating the category attributes at the second resource location; and
presenting, through the user interface, the category attributes thus updated by the document API as properties of the document.

15. The computer program product of claim 14, wherein the category is specific to a document type of the document, wherein the document comprises an invoice, wherein the category attributes comprise an invoice number, an invoice amount, an invoice status, and an approver for the invoice.

16. The computer program product of claim 15, wherein the document management system comprises an invoice management system and wherein the invoice management system is part of an enterprise resource planning system.

17. The computer program product of claim 16, wherein the invoice management system is configured for sending a notification about the copy of the document needing an approval review through a notification API to an approval tool, wherein the approval tool is configured for communicating an approval status reflective of the approval review through an approval API to the invoice management system, wherein the approval status is communicated to the document topic through the document workflow API, and wherein the approval status is placed in the document queue by the event mesh service and read from the document queue by the document API to update the category attributes stored at the second resource location.

18. The computer program product of claim 15, wherein the user interface comprises a user interface element for invoking an artificial intelligence (AI) content assistant, wherein a chat window for the AI content assistant is displayed through the user interface in response to the user interface element being actuated, and wherein the AI content assistant leverages a chat service to enable querying the invoice status using the invoice number provided through the chat window.

19. The computer program product of claim 18, wherein the content server is further configured for chunking the document into embeddings, wherein the embeddings are stored, through an embeddings service, in a vector form in a vector store, wherein the vector store is accessible by the chat service, wherein the chat service is configured for querying a large language model (LLM) with the embeddings, wherein the LLM is hosted on a machine learning platform and trained to generate a chat response based on the embeddings, and wherein the chat response is communicated through the chat service to the chat window.

20. The computer program product of claim 18, wherein the chat service is further configured for checking with the content server on a permission level of a user who is querying the invoice status using the invoice number.

* * * * *